(12) United States Patent
Peterson

(10) Patent No.: US 8,504,425 B2
(45) Date of Patent: Aug. 6, 2013

(54) PROCESS OF ADVERTISEMENTS

(75) Inventor: Mark Allen Peterson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 123 days.

(21) Appl. No.: 13/081,328

(22) Filed: Apr. 6, 2011

(65) Prior Publication Data

US 2012/0259710 A1 Oct. 11, 2012

(51) Int. Cl.
*G06Q 30/00* (2012.01)

(52) U.S. Cl.
USPC ..................................... 705/14.72

(58) Field of Classification Search
USPC ..................................... 705/14.72
See application file for complete search history.

(56) References Cited

U.S. PATENT DOCUMENTS

| | | | |
|---|---|---|---|
| 4,973,952 A * | 11/1990 | Malec et al. ............... | 340/5.91 |
| 6,230,173 B1 | 5/2001 | Ferrel et al. | |
| 7,092,969 B2 | 8/2006 | Meek et al. | |
| 7,584,419 B1 | 9/2009 | Jones et al. | |
| 7,698,719 B2 | 4/2010 | Evans et al. | |
| 7,720,814 B2 | 5/2010 | Jones et al. | |
| 7,721,198 B2 | 5/2010 | McGatha et al. | |
| 2002/0087352 A1* | 7/2002 | Armstrong et al. ........... | 705/1 |
| 2005/0171863 A1 | 8/2005 | Hagen | |
| 2006/0179080 A1 | 8/2006 | Meek et al. | |
| 2010/0095197 A1 | 4/2010 | Klevenz et al. | |
| 2010/0268606 A1 | 10/2010 | Wu | |

OTHER PUBLICATIONS

Curtis, "Extreme UltraDev—E-Commerce Database Design, Part I", Copyright 2000, Princeton University, found on line at www.princeton.edu/~rcurtis/ultradev/ecommdatabase.html.*
Berners-Lee, "Hypertext Markup Language—2.0", RFC 1866, Network Working Group, World Wide Web Consortium, Nov. 1995, archive maintained by the Internet Engineering Task Force and available on line at ietf.org.*
Clark, "XSL Transformations (XSLT) Version 1.0", Recommendation of the World Wide Web Consortium, Nov. 16, 1999, found on line at w3.org/TR/xslt.*

(Continued)

*Primary Examiner* — John G Weiss
*Assistant Examiner* — Scott C Anderson
(74) *Attorney, Agent, or Firm* — Nixon & Vanderhye P.C.

(57) ABSTRACT

An advertisement is dynamically generated using e.g. one or more computing devices. The generation of the advertisement includes generating a box configured to store information about a product to be included in the advertisement. The product is associated with a product identifier. A global unique identifier for the box is generated. A combination of the global unique identifier of the box with the product identifier of the product about which the box is configured to store information is stored as integration data. An ad elements data store is queried to retrieve a set of elements for the product. Each element in the set of elements was previously included in one or more different advertisements. The box is populated with an element of the set of elements for the product about which the box is configured to store information. The advertisement including the box is automatically generated.

21 Claims, 4 Drawing Sheets

OTHER PUBLICATIONS

Wong et al., "Is XML the way for corporate data?", CNET News, Jun. 24, 1999, found on line at news.cnet.com/2100-1001-227643.html.*

"HTML div tag," http://w3schools.cornitags/tag_div.asp available as early as May 15, 2011 per www.internetarchive.org (3 pages).

Office Action from Canadian Patent Application No. 2,769,799, mailed Dec. 7, 2012 (4 pages).

Rick Curtis, "Extreme UltraDev—E-Commerce Database Design, Part I", www.princeton.edu/~rcurtis/ultradev/ecommdatabase.html, Dec. 31, 2000 (4 pages).

Office Action from Canadian Patent Application No. 2,769,799, mailed Apr. 22, 2013 (4 pages).

* cited by examiner

PROCESS OF ADVERTISEMENTS

TECHNICAL FIELD

This disclosure relates to advertisements, and, more particularly, to utilizing digital asset management techniques in the creation, design, and analysis of advertisements.

BACKGROUND

Advertisements are an important mechanism by which retailers attract and retain customers. Each advertisement is designed by one or more designers (e.g., a creative team) that lay out the images and text of the advertisement. Typically, the creative team is provided with a list of the products to be included in the advertisement. For each product included on the list, the creative team may, e.g. locate or create a desired image and create appropriate text. The creative team then lays out the images and text for the products as well as other design elements to create the advertisement. Once an initial design of an advertisement is complete, the advertisement typically moves through an editing and approval process before being distributed. Thus, when the same product is featured in a later advertisement, the creative team re-locates or re-creates the appropriate images, recreates the appropriate text, generates a new layout for the images and text, and then gets approval for the image and text even though the same image and the same text may have previously received approval when they were included in the earlier advertisement.

SUMMARY

In general, this disclosure is directed to assisting the design process of advertisements through the re-use of existing assets. Techniques involve introducing a unique identifier with each of the elements of the advertisements. The unique identifier, in various instances, enables identification of related assets across multiple systems and across multiple different advertisements. Techniques of this disclosure enable related assets to be readily obtained and displayed to a user for inclusion in an advertisement.

In one example, a method for dynamically generating an advertisement with a computing device includes generating a box configured to store information about a product to be included in the advertisement, wherein the product is associated with a product identifier, and generating a global unique identifier for the box. The method also includes storing a combination of the global unique identifier of the box with the product identifier of the product about which the box is configured to store information as integration data, querying an ad elements data store to retrieve a set of elements for the product, wherein each element in the set was previously included in one or more different advertisements, populating the box with an element of the set of elements for the product about which the box is configured to store information, and automatically generating the advertisement comprising the box.

In another example, a system for dynamically generating an advertisement includes one or more programmable processor, an ad elements data store, an advertisement server module executable by the one or more programmable processors to generate a box configured to store information about a product to be included in the advertisement, and generate a global unique identifier for the box, wherein the product is associated with a product identifier. The system also includes a data integration module executable by the one or more programmable processors to store a combination of the global unique identifier of the box with the product identifier of the product about which the box is configured to store information as integration data, and a data load module executable by the one or more programmable processors to query the ad elements data store to retrieve a set of elements for the product. Each element in the set of elements was previously included in one or more different advertisements. The advertisement server module populates the box with an element of the set of elements for the product about which the box is configured to store information and automatically generates the advertisement including the box.

In another example, a computer-readable storage medium includes instructions for causing one or more programmable processors to generate a box configured to store information about a product to be included in an advertisement, wherein the product is associated with a product identifier, generate a global unique identifier for the box, and store a combination of the global unique identifier of the box with the product identifier of the product about which the box is configured to store information as integration data. The instructions further cause the one or more programmable processors to query an ad elements data store to retrieve a set of elements for the product, wherein each element in the set was previously included in one or more different advertisements, populate the box with an element of the set of elements for the product about which the box is configured to store information, and automatically generate the advertisement including the box.

In another example, a method for generating an advertisement includes generating, with the computing device, a software object configured to store information about a product to be included in the advertisement, in which the product is associated with a product identifier, generating a global unique identifier for the software object, associating the global unique identifier of the software object with the product identifier of the product about which the software object is configured to store information, retrieving a set of elements associated with the product using the product identifier, populating the software object with an element of the set of elements for the product about which the software object is configured to store information, associating at least one of the global unique identifier of the software object or the product identifier of the product about which the software object is configured to store information with an element identifier of the element of the set of elements, and automatically generating the advertisement comprising the box.

Techniques of this disclosure may provide several advantages. For example, the disclosed techniques may enable a system to automatically generate an advertisement that utilizes previously approved images, text, and multimedia content. Examples in accordance with this disclosure may also, in various instances, enable a creative team to re-use previously approved text, images, and multimedia content, streamlining the editing and approval process. By facilitating the re-use of existing elements, the disclosed techniques may also simplify the creation of multiple versions of an advertisement targeted at a particular audience. In some examples, techniques of this disclosure may also facilitate improved analytics of sales information associated with an advertisement, which may be utilized to evaluate the effectiveness of the advertisement, adjust the pricing of certain products, and further improve the design and layout of the advertisements.

The details of one or more embodiments of this disclosure are set forth in the accompanying drawings and the description below. Other features, objects, and advantages of the disclosure will be apparent from the description and drawings, and from the claims.

DETAILED DESCRIPTION

Conventional advertisement design systems require a creative team to recreate text and recreate or re-locate images across disparate systems for each advertisement produced by the creative team, resulting in extra work for the creative team and longer advertisement production schedules. Techniques of this disclosure utilize a global unique identifier to enable the integration of disparate systems or data sources in a manner that is transparent to a creative team and facilitates the re-use of existing graphical, textual, and multimedia elements. Associations between the global unique identifier and other identifiers (e.g., product identifiers and advertisement identifiers) are maintained by the design system. The associations between the global unique identifiers and the other identifiers enable the design system to automatically locate and retrieve information associated with a particular product or advertisement, such as sales information or textual, graphical, or multimedia elements utilized in an advertisement.

The global unique identifier also enables the design system to dynamically generate advertisements. The design system may combine a list of products to be included in a new advertisement, advertisement page starting files, and previously utilized graphical, textual, and multimedia elements to create the new advertisement. Furthermore, the global unique identifier enables the creative team, when editing an advertisement, to simply right click on an element of the advertisement that the creative team member would like to change (e.g., an image of a product) and the design system automatically retrieves other elements associated with the product. That is, according to techniques of this disclosure, a design system utilizes the global unique identifier to integrate disparate data stores in a manner that is transparent to a creative team while also facilitating the re-use of existing graphical, textual, and multimedia elements.

Figure 1:
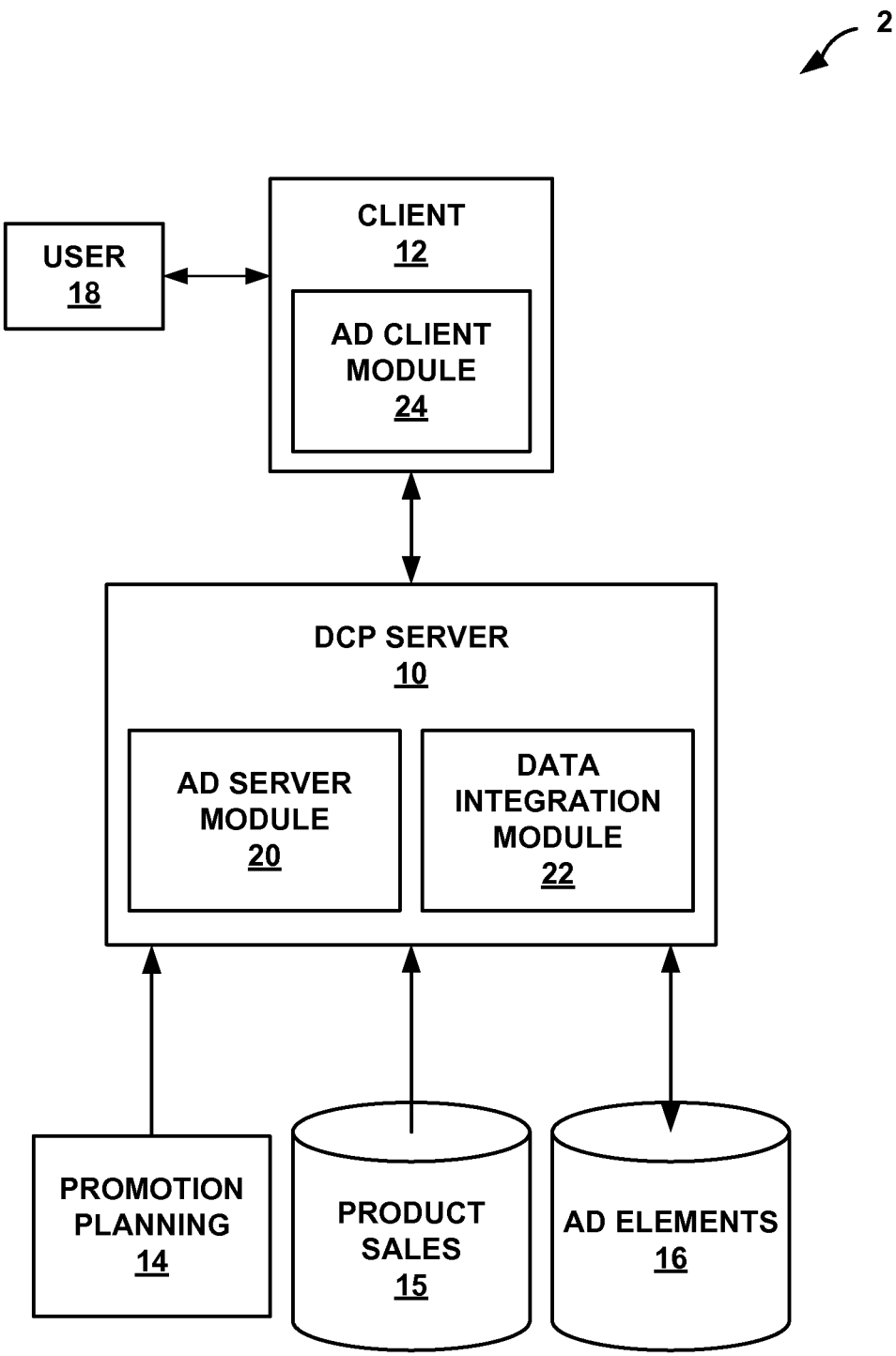
FIG. 1 is a block diagram illustrating an example advertisement design system that implements techniques of this disclosure.

FIG. 1 is a block diagram illustrating an example advertisement design system 2 that implements techniques of this disclosure. As shown in FIG. 1, advertisement design system 2 includes dynamic content publishing (DCP) server 10, client 12, promotion planning device 14, product sales data store 15, ad elements data store 16, and user 18. In general, product sales data store 15 is configured to store sales information about a number of products. Ad elements data store 16 is configured to store text, images, and other elements for products that may be included in advertisements generated in accordance with techniques disclosed herein.

Product sales data store 15 and ad elements data store 16 (collectively, "data stores 15, 16") may include a standard or proprietary database or other data storage and retrieval mechanism. Data stores 15, 16 may be implemented in software, hardware, and combinations of both. For example, ad elements data store 15 may include proprietary database software stored on one of a variety of storage mediums on a data storage server connected to DCP server 10 and configured to send to and collect ad data from DCP server 10. Storage mediums included in or employed in cooperation with data stores 15, 16 may include, e.g., any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

In some examples, DCP server 10, client 12, product sales data store 15, and ad elements data store 16 may be communicatively connected via a network. The network may include one or more terrestrial and/or satellite networks interconnected to provide a means of communicatively connecting client 12 to DCP server 10. For example, the network may be a private or public local area network or wide area network, including, for example, the Internet. The network may include both wired and wireless communications according to one or more standards and/or via one or more transport mediums. For example, the network may include wireless communications according to one of the 802.11 or Bluetooth specification sets, or another standard or proprietary wireless communication protocol. The network may also include communications over a terrestrial cellular network, including, e.g. a GSM (Global System for Mobile Communications), CDMA (Code Division Multiple Access), EDGE (Enhanced Data for Global Evolution) network. Data transmitted over the network, e.g., from client 10 to DCP server 10 may be formatted in accordance with a variety of different communications protocols. For example, all or a portion of the network may be a packet-based, Internet Protocol (IP) network that communicates data from client 12 to DCP server 10 in Transmission Control Protocol/Internet Protocol (TCP/IP) packets, over, e.g., Ethernet via Category 5 cables.

DCP server 10, client 12, and promotion planning device 14 may include any number of different computing devices. For example, DCP server 10, client 12, and promotion planning device 14 may include networked computing devices that include network communication elements configured to send and receive data via a network. As another example, DCP server 10 or promotion planning device 14 may include a data processing appliance, web server, specialized media server, or another type of computing device. Examples of client device 12 include desktop computers, tablet computers, laptop computers, cellular phones, or other portable, non-portable, or mobile devices. Additionally, although the example of FIG. 1 includes one DCP server 10, one client 12, and one promotion planning device 14, other examples may include a number of co-located or distributed computing devices configured in accordance with techniques of this disclosure.

Promotion planning device 14 may provide one or more users (e.g., user 18) with tools to plan which products may be included in a particular advertisement, the type of the advertisement (e.g., screen, print, pop-up, banner, etc. . . . ), and where in the advertisement the products may appear (e.g., on the top left side of page two of the advertisement). Promotional planning device 14 may also be utilized to provide pricing information for each of the products included in the advertisement. In some examples, promotion planning device 14 provides the promotion planning and product information for the advertisement to DCP server 10. For purposes of clarity and brevity, the promotion planning and product information may be referred to as "product information" throughout this disclosure. That is, product information described in this disclosure may also include promotion planning information, such as product placement in the advertisement and pricing information.

As shown in FIG. 1, DCP server 10 includes an ad server module 20 and data integration module 22. In accordance with techniques of this disclosure, ad server module 20, in various instances, is configured to dynamically generate advertisements. One type of advertisement that has been used to bring existing and new customers into retail stores is the periodical advertisement, which includes, e.g., the weekly circular. Weekly circulars are advertisements printed for mass distribution in e.g. newspapers, such as the Sunday edition of a local newspaper.

In some examples, user 18 interacts with client 12 to cause ad client module 24 to send a request to ad server module 20 that causes ad server module 20 to generate an advertisement. In other examples, DCP server 10 receives a file from promotion planning device 14 that indicates various products to be included in a particular advertisement. Upon receiving the file, ad server module 20 may automatically generate an advertisement based on the product information included in the file.

Data integration module 22 is configured to integrate data from various data sources, such as product sales data store 15 and ad elements data store 16. Data stores 15, 16 may be configured to store different information using different fields and different identifiers for identifying information that may be related. Data integration module 22 is configured to identify related information from multiple data stores and integrate the related information for further processing by DCP server 10 through the use of a global unique identifier. In order to identify and integrate the related information, data integration module 22 maintains a data store that includes a global unique identifier and associates the global unique identifier with other identifiers utilized by product sales data store 15 and ad elements data store 16.

For example, when ad server module 20 generates an advertisement, data integration module 22 populates the data store with the global unique identifiers created for each element of the advertisement, the product identifiers for each product, and the ad element identifiers for elements ad server module 20 retrieves from ad elements data store 16 for inclusion in the advertisement. In other words, data integration module 22 maintains an association between a global unique identifier and identifiers associated with other data sources in order to integrate the various data sources and systems and make the data stored in the various data sources available to DCP server 10. While shown in FIG. 1 as integrating data from two different data stores, data integration module 22 may be configured to identify and integrate data from any number of different data stores.

Each element within an advertisement (e.g., each image, each text box, and each multimedia element) may be associated with a global unique identifier that uniquely identifies the particular graphical, textual, or multimedia element across all advertisements and all products. Furthermore, each product included in an advertisement may be associated with a product identifier that uniquely identifies a particular product, and each advertisement may be associated with an identifier that uniquely identifies the particular advertisement. Other identifiers may be included in the advertisement design and analysis system, such as a product sales identifier that uniquely identifies the sales for a particular product for a particular time period. Data integration module 22 utilizes the global unique identifier associated with each element within an advertisement in combination with the other identifiers to integrate the data from the various different data sources. That is, the global unique identifier enables DCP server 10 to integrate data from multiple different data sources for generating an advertisement and analyzing the effectiveness of the advertisement (e.g., based on product sales information).

In general, user 18 interacts with client 12 and ad client module 24 to retrieve an advertisement from DCP server 10 and edit the advertisement. Ad client module 24 may be configured to provide a user interface to user 18 for modifying the advertisement. When user 18 is editing the advertising, ad client module 24 may retrieve advertisement data from DCP server 10 (e.g., text and images stored in ad elements data store 16) and present the advertisement data to user 18 via the user interface. For example, when user 18 begins editing the advertisement, user 18 may select different images or different text for a particular product by, for example, performing a secondary selection technique (e.g., right clicking) on the element of the advertisement user 18 would like to change.

As one example, user 18 performs the secondary selection technique on an image of a bottle of laundry detergent. Ad client module 24 detects the secondary selection and requests images associated with the bottle of laundry detergent from DCP server 10. As described above, each element of the advertisement is assigned a global unique identifier. The element that includes the image of the bottle of laundry detergent typically does not include a product identifier that uniquely identifies the particular bottle of laundry or an advertisement element identifier that uniquely identifies the particular image of the bottle of laundry. Instead, data integration module 22 utilizes the global unique identifier included in the element to query the associations between the various data sources maintained by DCP server 10 to retrieve information from each of the various data sources.

When ad client module 24 sends a request for the related images, ad client module 24 sends the global unique identifier associated with the element and a command to cause DCP server 10 to retrieve the images associated with the bottle of laundry detergent based on the global unique identifier. DCP server 10 receives the request and extracts the global unique identifier. Data integration module 22 then queries the associations between the various data sources maintained by DCP server 10 to associate the global unique identifier with a product identifier in order to retrieve images of the bottle of laundry detergent from ad elements data store 16. DCP server 10 queries ad elements data store 16 based on the product identifier associated with the global unique identifier and sends the matching images to ad client module 24 for display to user 18. User 18 may then select one of the images to replace the previous image or may cancel the selection and maintain the previous image.

User 18 may modify one or more elements of the advertisement before concluding that the advertisement is ready for distribution. In some examples, the advertisement may go through several iterations and an approval process before the advertisement is deemed ready for distribution and the content of the advertisement is finalized. Once the advertisement is finalized, DCP server 10 may parse the advertisement in order to identify each of the elements of the advertisement. DCP server 10 extracts the global unique identifier included in each element and data integration module 22 retrieves the product identifier associated with the global unique identifier. The product identifier identifies the product illustrated by the image or described by the text. For each element, DCP server 10 may create a new entry in ad elements data store 16 to store the product identifier associated with the element, an ad element identifier that uniquely identifies that particular element being stored, and the content of the element (e.g., the image or text stored in the box of the advertisement).

In this manner, a global unique identifier may enable various elements included in advertisements to be readily identified and re-used when designing advertisements. The global unique identifier may also facilitate the automatic creation of advertisements that may be pre-populated with previously edited and approved text and images for one or more of the products included in the advertisement, which may decrease the amount of time that is required to design an advertisement and streamline the editing and approval process. In addition, by facilitating the re-use of existing elements, techniques of this disclosure may also simplify the creation of multiple versions of an advertisement targeted at a particular audience for a particular time period.

Figure 2:
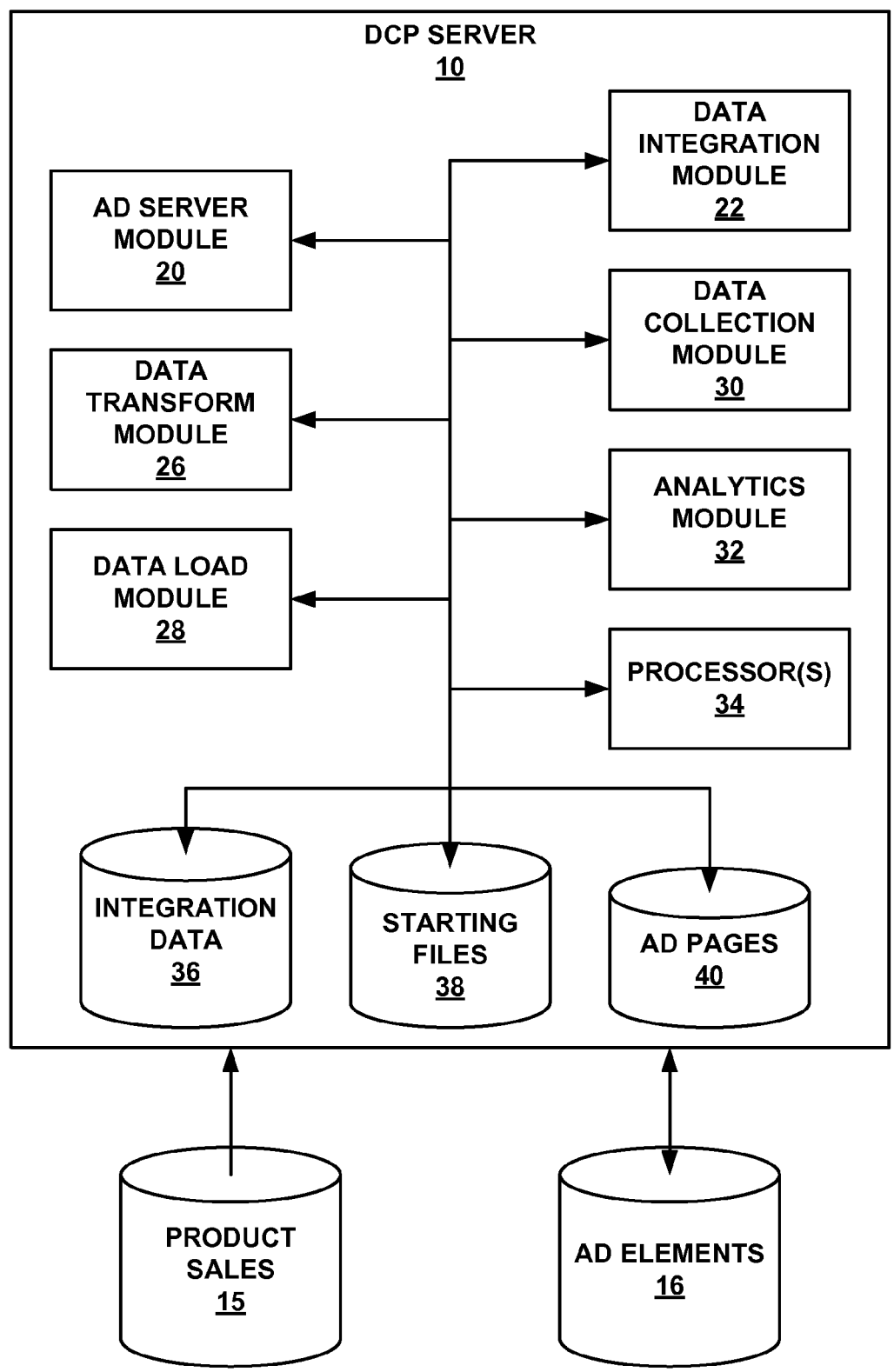
FIG. 2 is a block diagram illustrating an example implementation of a dynamic content publishing server of the advertisement design system of FIG. 1.

FIG. 2 is a block diagram illustrating an example implementation of a dynamic content publishing (DCP) server 10 of the advertisement design system 2 of FIG. 1. As shown in FIG. 2, DCP server 10 includes ad server module 20, data integration module 22, data transform module 26, data load module 28, data collection module 30, analytics module 32, processors 34, integration data 36, starting files data store 38, and ad pages data store 40. DCP server 10 is shown as communicatively connected to product sales data store 15 and ad elements data store 16. DCP server 10, product sales data store 15, and ad elements data store 16 may be communicatively connected via a network, as described with reference to FIG. 1. Processors 34 may be configured to implement functionality and/or processing instructions for execution within DCP server 10.

Integration data 36, starting files data store 38, and ad pages data store 40 may each be stored within a memory and/or a storage device. The memory may be configured to store information within DCP server 10 during operation. In some examples, the memory may be described as a computer-readable storage medium. The memory may be a temporary memory, meaning that a primary purpose of the memory is not long-term storage. The memory may also be described as a volatile memory, meaning that the memory does not maintain stored contents when DCP server 10 is turned off. Examples of volatile memories include random access memory (RAM), dynamic random access memory (DRAM), static random access memory (SRAM), and other forms of known volatile memories. In some examples, the memory may be used to store program instructions for execution by processors 34. The memory may be used by software or applications running on DCP server 10 (e.g., software required to automatically generate advertisements) to temporarily store information during program execution.

The storage device may also include one or more computer-readable media and may be configured to store larger amounts of information than the memory. The storage device may be further configured for long-term storage of information, even when DCP server 10 is not operating. In some examples, the storage device may comprise non-volatile storage elements. Examples of such non-volatile storage elements include magnetic hard disks, optical disks, floppy disks, flash memories, or forms of electrically programmable memories (EPROM) or electrically erasable and programmable memories (EEPROM).

Any applications implemented within or executed by DCP server 10, e.g., ad server module 20, may be implemented or contained within, operable by, executed by, and/or be operatively coupled to processors 34, the memory, and/or the storage devices. In some examples, ad server module 20, data integration module 22, data transform module 26, data load module 38, data collection module 30, and analytics module 32 may each comprise a software application implemented by processors 34. In other examples, one or more of modules 20, 22, 26, 28, 30, and 32 may comprise firmware, analog circuitry, one or more processors, and/or one of or a portion of processors 34.

As described above, ad server module 20, in various instances, is configured to dynamically generate advertisements and exchange information with one or more clients (e.g., client 12 of FIG. 1). Data integration module 22 maintains associations between global unique identifiers and one or more of product identifiers, ad element identifiers, and advertisement identifiers, also referred to herein as promotion identifier. Data integration module 22 creates entries (e.g., rows in a database table) in integration data 36 that include a global unique identifier and one or more of the product, ad element, and advertisement identifiers.

In some examples, DCP server 10 receives product information for a particular advertisement (e.g., from promotion planning device 14 of FIG. 1). The product information includes an advertisement identifier that uniquely identifies a particular advertisement and may be associated with temporal, demographic, and/or geographic information that identifies an intended audience or recipient of the particular advertisement. The product information also includes information about each of the products to be included within the advertisement, including a product identifier, the page on which the product is to appear within the advertisement, and an approximate location on the page where the product should appear.

In some examples, the product information may be included in one or more data files loaded into DCP server 10 via promotion planning device 14 or may be entered by a user via a user interface of a client device (e.g., user 18 and client 12 of FIG. 1). The product information may be stored within DCP 10 during the creation of an advertisement in accordance with techniques described in this disclosure. The product information may be encoded in a particular format, such as in accordance with an extensible markup language (XML) syntax. Upon receiving the product information, data transform module 26 may determine that the format in which the product information was received is different than the format required by ad server module 20 to generate an advertisement. Data transform module 26 may then apply extensible style sheet language transformations (XSLT) to the product information to convert the product information from being encoded in accordance with a first XML syntax to being encoded in accordance with a second XML syntax. That is, data transform module 26 is configured to transform data encoded in one format to data encoded in a different format.

For example, ad server module 20 may require that the product information be encoded in accordance with the second XML syntax in order to utilize the product information in various processes. However, the product information may be received by DCP server 10 in accordance with the first XML syntax. In one example, the first XML syntax may encode an advertisement identifier with the tag <promoid>, a page number with the tag <pagenum>, and a product identifier with the tag <prodid>. By applying XSLT with data transform module 26, the <promoid> tag may be transformed into a <advertisementid> tag, the <pagenum> tag may stay the same, and the <prodid> tag may be transformed into a <productidentifier> tag, as required by the second XML syntax. The values encoded with the tags do not change when the encoding is transformed from the first XML syntax to the second XML syntax.

Once the product information is in the format required by ad server module 20, module 20 may issue a command to data load module 28 to retrieve advertisement starter files stored in starting files 38. In some examples, starting files data store 38 may store advertisement identifiers and page identifiers in order to associate certain starting files with a particular page and advertisement. In other examples, starting files data store 38 may store one or more different starting files that are not specifically configured for a particular advertisement, but may be configured for a particular page within an advertisement. For example, starting files data store 38 may store one starting file for a front page, another starting file for interior pages, and a third starting file for a back page of an advertisement. The starting files include layout information about each page that may be consistent between advertisements, such as crop marks, lead information, and slug layout.

Ad server module 20 creates the pages of the advertisement based on the retrieved starting files. As described above, the product information that is processed by DCP server 10 includes a page number and a product identifier for each product that is to be included in the advertisement. Ad server module 20 creates new boxes and assigns each new box a new global unique identifier and assigns a product to one or more of the boxes (e.g., by associating a product identifier with a global identifier for each box). For each box, ad server module 20 causes data load module 28 to retrieve ad elements from ad elements data repository 16 based on the product assigned to the box and inserts the retrieved ad elements into the appropriate boxes. The ad elements include the graphic, text, or multimedia content as well as formatting information that is applied to the graphic, text, or multimedia content the control how the content is displayed or rendered in the advertisement. When there are two or more ad elements stored in ad elements data repository 16 for a particular product, data load module 28 may select which one of the ad elements to retrieve by, for example, selecting the ad element that was most recently used in an advertisement.

Figure 3:
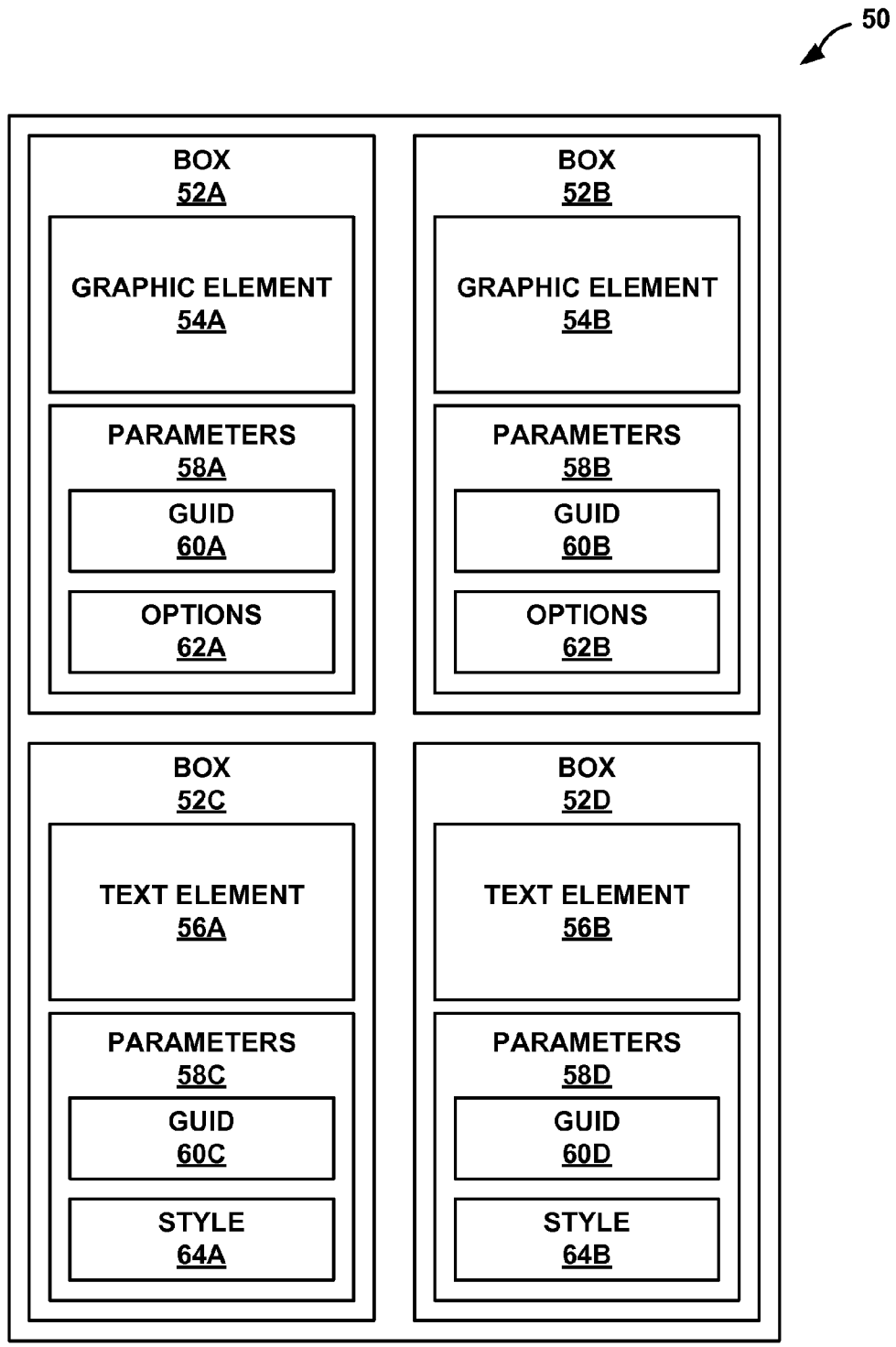
FIG. 3 is a conceptual diagram illustrating an example of a dynamically generated draft advertisement consistent with this disclosure.

Boxes, as used in this disclosure, may refer to software objects that act as virtual containers that may be associated with advertisement elements, e.g. graphical, textual, or multimedia elements associated with a particular product. In one example, advertisements according to this disclosure include a number of boxes arranged on one or more pages of the advertisement, in which one or more elements associated with a particular product may be arranged. An example of one page of an advertisement according to this disclosure including a number of boxes is illustrated in FIG. 3.

In one example, the boxes may be automatically populated with graphical, textual, and multimedia elements by ad server module 20 based on the product assigned to each box and to the type of element each box is configured to store. Typically, each box includes metadata and one of graphical data (e.g., images), textual information, or multimedia information (e.g., a video object or an Adobe® Flash® object) about the product assigned to the box. The ad elements retrieved from ad elements data store 16 may include graphics, images, text, and/or multimedia objects. Ad server module 20 is configured to insert textual ad elements into text boxes, graphical ad elements into image boxes, and multimedia elements into multimedia boxes for each product based on the product assigned to each box. In some instances, no ad elements may be retrieved from ad elements data store 16. In these examples, ad server module 20 is configured to assign the global unique identifier to the box, but does not insert ad elements into the box. The box remains empty until a user creates or locates content for the box during the editing process. Once the box is populated by the user, the content of the box is captured and included in ad elements data store 16 using techniques described below.

In another example, the boxes may be manually populated by a user. The user is presented with a user interface that displays a page having empty boxes and the retrieved ad elements. The user may then interact with the user interface to populate each box with ad elements selected by the user (e.g., by dragging and dropping the desired elements into the appropriate boxes). The user, in various instances, may re-arrange the boxes or change the size or orientation of the boxes. Once the user has populated the boxes with ad elements, ad server module 20 captures the product identifier associated with each ad element used to populate each box and associates the global unique identifier included with each box with the product identifier.

After the boxes are populated with graphical and textual elements, whether automatically by ad server module 20 or manually by a user, ad server module 20 passes the global unique identifier for each box, the product identifier associated with the box, the advertisement identifier, and the ad elements identifier to data load module 28. If no ad elements were retrieved for a box, ad server module 20 passes the global unique identifier of the box, the product identifier of the product assigned to the box, and the advertisement identifier to data load module 28, but ad server module 20 does not pass an ad elements identifier to data load module 28. Data load module 28 stores the association between the global unique identifier and the other identifiers in integration data 36.

Once ad server module 20 creates the pages and populates the boxes with the retrieved ad elements, if any, ad server module 20 passes the pages to data load module 28 for storage in ad pages data store 40. Data load module 28 is configured to store the pages in ad pages data store 40 along with an advertisement identifier to associate the pages with a particular advertisement. In some examples, the pages may be stored in a particular format, such as the Adobe® InDesign® document format utilized by Adobe® InDesign® CS5, offered by Adobe® Systems Incorporated of San Jose, Calif. In these examples, ad server module 20 may include the Adobe® InDesign® CS5 Server software offered by Adobe® Systems Incorporated of San Jose, Calif. and ad client module 24 may include the Adobe® InDesign® CS5 software offered by Adobe® Systems Incorporated of San Jose, Calif.

A user may utilize a client computer to retrieve and modify the stored advertisement pages. For example, user 18 of FIG. 1 may interact with ad client module 24 executing on client 12 to change the text or images included in one or more pages of the advertisement. In order to load the pages to client 12, ad client module 24 may execute a command to ad server module 20 to cause one or more of the pages to be retrieved from ad pages data store 40 and sent to ad client module 24 via DCP server 10. Ad client module 24 then presents one or more pages to user 18 via a user interface generated by ad client module 24.

In one example, user 18 chooses to replace a graphical, textual, or multimedia element included on a page. User 18 may perform a secondary selection action (e.g., right-click) on the element user 18 would like to replace. Upon receiving the secondary selection action command, ad client module 24 may be configured to issue a command to ad server module 20 to retrieve one or more other elements of the same type associated with the product from ad elements data store 16. For example, if user 18 chose to modify text, ad server module 20 issues a command to retrieve other text elements associated with the product from ad elements repository 20. As another example, if user 18 chose to replace an image, ad server module 20 issues a command to retrieve other graphical elements associated with the product from ad elements repository 20.

The command issued to ad server module 20 includes the global unique identifier assigned to the particular box that is currently holding the element user 18 would like to replace. Ad server module 20 passes the global unique identifier to data integration module 22 to retrieve the product identifier associated with the global unique identifier from integration data 36. Ad server module 20 then causes data load module 28 to query ad elements data store 16 to retrieve other elements of the same type having the same product identifier, and sends the retrieved elements to ad client module 24 for display to user 18. That is, DCP server 10 utilizes the global unique identifier to identify the product included in the box of the advertisement page and retrieves other elements stored in ad elements data store 16 associated with the same product without requiring user 18 to have any knowledge of the product identifier or the global unique identifier.

User 18 is presented with the additional elements retrieved from ad elements data store 16. User 18 may select a different element or may choose to keep the previous element. In some examples, user 18 may be presented with additional information about each element. For example, each element, as displayed to user 18 for selection, may include information about the particular advertisements in which the element was previously included, such as demographic, geographic, or temporal information. The additional advertisement information may be stored in ad pages data store 40 or another data store and may be associated with a particular advertisement based on an advertisement identifier.

When user 18 changes the elements stored by a box, the global unique identifier included with the box does not change when the new element is associated with the same product. If the user includes an element associated with a different product in the box, ad client module 24 extracts the product identifier associated with the new element included in the box and sends the global unique identifier of the box and the new product identifier of the element to ad server module 20 to update integration data 36 to reflect the new association between the global unique identifier and the product identifier associated with the new product added by the user. User 18 may edit the pages over different user sessions that may span one or more days. Each time user 18 completes an editing session, the updated pages of the advertisement may be stored by ad server module 20 in ad pages data repository 40.

After user 18 completes a draft of the advertisement, the advertisement may go through an editing and approval process. Typically, one or more people other than user 18 review the draft advertisement. The reviewer approves or suggests changes to the draft advertisement and notifies user 18 of the approval or suggested changes. In one example, the draft advertisement prepared by user 18 includes products from two or more different departments and each department is responsible for reviewing and approving the content of the draft advertisement that relates to products included in the department. In this example, the DCP server 10 may notify the reviewers that the draft advertisement is ready for review. DCP server 10 may identify the individuals and departments responsible for the review based on the global unique identifier included in each box. Data integration module 22 may retrieve the product identifier from integration data 36. Based on the product identifier, DCP server may determine the department to which each product belongs and a reviewer responsible for the product. DCP server 10 may then notify each reviewer that content is ready for the reviewer to review.

In some examples, DCP server 10 may include the content the reviewer needs to review in the notification while excluding all or a portion of the content that the reviewer is not responsible for reviewing. That is, the reviewer may be presented with all of the content of the page on which content the reviewer is responsible for reviewing appears while excluding pages of the advertisement on which no content the reviewer is responsible for reviewing appears. Once the reviewer approves the content included in the box, the reviewer may not be notified by DCP server 10 that the content included in the box needs to be reviewed unless the content included in the box is changed after the reviewer gives approval. In this manner, DCP server 10 may utilize the global unique identifier to automatically determine who needs to review the content included in each box, notify the appropriate reviewers, and enable the reviewer to review the relevant content while filtering out the other content and products for which the reviewer is not responsible for reviewing.

After user 18 has completed editing the advertisement and created a final version (e.g., a version of the advertisement that is complete and ready to distribute), data collection module 30 processes the final version of the advertisement to capture the updated elements. Data collection module 30 parses each page of the advertisement into individual elements (e.g., boxes) and stores the information included in each element in ad elements data store 16. As one example, data collection module 30 queries integration data 36 using the global unique identifier assigned to a box in order to retrieve the product identifier associated with the box. If the box included a graphical element, the graphical element, along with the product identifier, are stored within ad elements data store 16. If the box included a textual element, in one example, an image of how the text was displayed in the advertisement is generated based on the textual element, the actual text of the textual element (e.g., without the formatting information included in the textual element applied to the text) is maintained as metadata associated with the textual element, and the textual information, image, and associated metadata is stored in ad elements data store 16. When collecting the elements from a finalized advertisement, data collection module 30 may capture additional metadata for each box. For example, data collection module 30 may capture demographic, geographic, and/or temporal information of the advertisement as well as keywords associated with the product and store that information as metadata associated with the image stored in ad elements data store 16.

After the advertisement is distributed and sales information is collected and stored in product sales data store 15, the global unique identifier assigned to each box may enable a user to analyze the sales information based on the design of the advertisement. The product sales data may be automatically collected by an inventory system that monitors in-store and online sales based on the product identifier for each product. The sales information may include time and date information for each sale as well as geographic location for each sale (e.g., based on store location for in-store sales and based on delivery address for online sales). The sales information is stored in product sales data store 15 along with the product identifier for the product associated with the sales information. Product sales data store 15 includes a product identifier as well as sales information associated with the product identifier. Analytics module 32 may utilize the global unique identifier to retrieve advertisement information, a product identifier, and sales information for the product and present the information to a user.

For example, if a user analyzes the sales of laundry detergent in a particular week that the laundry detergent was featured in an advertisement, analytics module 32 may receive the advertisement identifier for the advertisement in which the laundry detergent was featured as well as the product identifier for the laundry detergent. Analytics module 32 may then cause data load module 28 to retrieve the identifiers associated with the product and advertisement. Using the global unique identifiers, analytics module 32 may then retrieve additional information about the graphic element, textual elements, and multimedia elements, if any, that were utilized to feature the laundry detergent in the advertisement. For example, analytics module 32 may retrieve information about the size of the graphical and textual elements, the placement of the elements within the advertisement, as well as the actual image and text used in the advertisement. In some examples, analytics module 32 may be configured to compare sales across different advertisements based on various factors, such as location of the product within the advertisement, the size of the graphical or image elements associated with the product, the target audience of the advertisement (e.g., the demographic or geographic information), among other factors.

While described as DCP server 10 performing the data collection and analysis functions, the data collection and analysis functions may be performed by other devices communicatively connected to product sales data store 15 and ad elements data store 16. Furthermore, the functionality of each of modules 20, 22, 26, 28, 30, and 32 may be split across two or more devices. In some examples, each of integration data 36, starting files data store 38, and ad pages data store 40 may be located on different devices that are communicatively connected to DCP server 10. That is, the functionality attributed to DCP server 10 may be distributed among two or more devices.

FIG. 3 is a conceptual diagram illustrating an example advertisement page 50 of an advertisement consistent with this disclosure. As shown in FIG. 3, advertisement page 50 includes boxes 52A-52D (collectively, "boxes 52"). Boxes 52 may store graphical or textual information, e.g. graphical or textual elements from ad elements store 16 and may be placed anywhere on a page of an advertisement. In the example of FIG. 3, boxes 52A and 52B store graphical elements 54A and 54B, respectively, while boxes 52C and 52D store textual elements 56A and 56B, respectively.

Each of boxes 52 include parameters 58A-58D (collectively, "parameters 58") that specify certain parameters associated with each of boxes 52. For example, parameters 58 include global unique identifiers (GUIDs) 60A-60D (collectively, "global unique identifiers 60"). Global unique identifiers 60 store the global unique identifier created by ad server module 20 shown in FIG. 2. Parameters 58A and 58B include options 62A and 62B. Options 62A and 62B may include options that control how graphic elements 54A and 54B may be displayed. For example, options 62A and 62B may include information that specifies the size, transparency, or other layout characteristics of graphic elements 54A and 54B. Parameters 58C and 58D include styles 64A and 64B. Styles 64A and 64B may specify a font, size, or other style information that controls how text elements 56A and 56B are displayed in the advertisement.

With respect to DCP server 10 shown in FIG. 2, ad server module 20 populates advertisement page 50 with elements retrieved from ad elements data store 16 when creating the advertisement pages. For example, when populating box 52A, ad server module 20 may retrieve a graphical element from ad elements data store 16. The graphical element may include an image and a set of parameters that were configured when the graphical element was used in a previous advertisement. Ad server module 20 may extract the image from the retrieved graphical element and insert the image into graphical element 54A. Ad server module 20 may also extract the parameters from the retrieved graphical element and set the values of options 62A to the corresponding extracted parameter values. Ad server module 20 sets the value of global unique identifier 60A to the value of the new global unique identifier ad server module 20 generated when creating the box in the advertisement page 50.

While illustrated as including four boxes having two graphical elements and two textual elements, advertisement page 50 may include any number of different boxes having any combination of different graphical, textual, or multimedia elements. Boxes 52 may also include other elements and parameters 58 may include additional parameters. Furthermore, the boxes may be arranged in any configuration, not just the two-by-two configuration shown in FIG. 3. For example, one way in which users may finalize an advertisement generated in accordance with the disclosed techniques is by repositioning boxes, and the elements included therein on a page.

Figure 4:
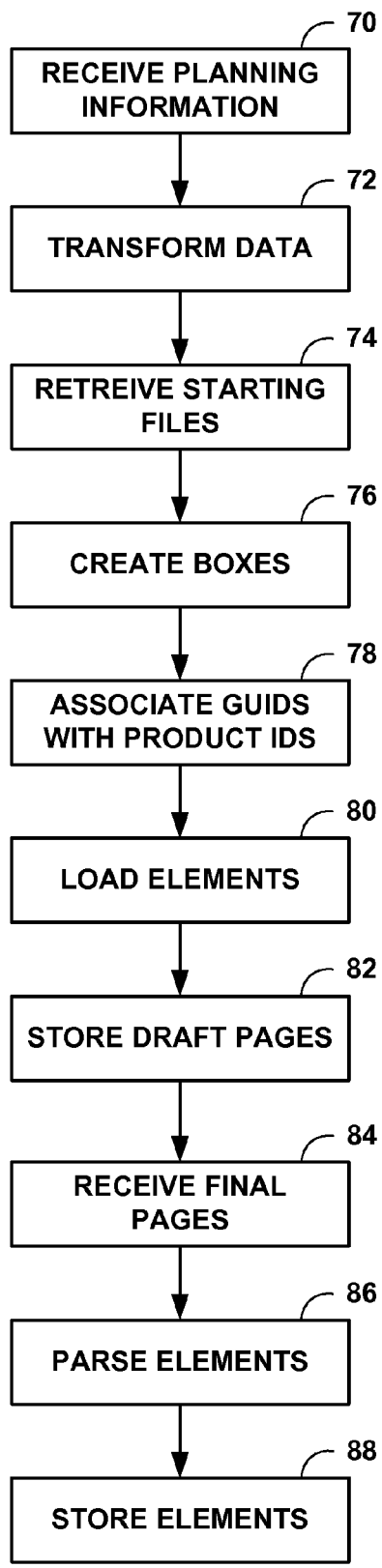
FIG. 4 is a flowchart illustrating an example operation of a dynamic content publishing server that implements techniques of this disclosure.

FIG. 4 is a flowchart illustrating an example operation of a dynamic content publishing server that implements techniques of this disclosure. For purposes of illustration only, the example operation is described below in the context of advertisement system 2 of FIG. 1 and DCP server 10 of FIG. 2, though various other systems and/or devices may be utilized to implement or perform the operations shown in FIG. 4.

In the example shown in FIG. 4, DCP server 10 receives planning information for an advertisement (70) (e.g., from promotion planning device 14). In one example, DCP server 10 receives the product information as one file per page of the advertisement. In another example, DCP server 10 receives one file that includes product information for the entire advertisement. In yet another example, DCP server 10 receives a command to load the product information from a data store. The product information may be encoded in a particular format, such as in accordance with an extensible markup language (XML) syntax. When the product information is received in a format that is different than the format required by DCP server 10, data transform module 26 transforms the data into the format required by DCP server 10 (72). In examples where the product information is encoded in accordance with an XML syntax, data transform module 26 may apply extensible style sheet language transformations (XSLT) to the product information to convert the product information from being encoded in accordance with a first XML syntax to being encoded in accordance with a second XML syntax, where the second XML syntax is the syntax required by DCP server 10.

Once the product information is in the format required by ad server module 20, ad server module 20 may issue a command to data load module 28 to retrieve advertisement starting files stored in starting files data store 38 (74). Ad server module 20 then creates the boxes for the pages and places the boxes on the pages based, at least in part, on the retrieved starting files (76) and assigns new global unique identifiers (GUIDs) to each box. The boxes created by ad server module 20 are each configured to store a graphical, textual, or multimedia element, as set forth by the received planning information used by ad server module 20 when creating the boxes. That is, the planning information may specify, e.g. the number, placement, and configuration of the boxes created by ad server module 20 for a particular page. Each box is created to store information about a product. In some examples, the planning information specifies which products are associated with which boxes. In other examples, user 18 may select the product to be associated with a box. In either instance, the product is identified in the product information by a product identifier and ad server module 20 associates the global unique identifier created for a certain box with the product identifier of the product associated with the box (78).

The association between the global unique identifier and the product identifier is stored in integration data 36 by data load module 28. Ad server module 20 then loads the elements associated with the product identifier, if any, from ad elements data store 16 (80). In some examples, a product may not have any elements associated with the product stored in ad elements data store 16. In these examples, ad server module 20 does not pre-populate the box, but rather leaves the box empty. In other examples, a product may have several different graphical elements or textual elements associated with the product. In these examples, ad server module 20 may select which element to include in the box in any manner. In one example, ad server module 20 may select the element that was most recently included in any of a number of previous advertisements or the element that was used in an advertisement directed to the same geographic area. In another example, ad server module 20 may present the different elements to user 18 for selection via client 12 and ad client module 24. In any case, ad server module 20 loads elements for each of the boxes (80) and stores the pages in ad pages data store 40 (82).

During the editing and approval process, user 18 may change elements stored in various boxes, may reorganize the boxes, and may add or delete boxes. When user 18 changes the elements stored by a box, the global unique identifier included with the box does not change when the new element is associated with the same product. If the user includes an element associated with a different product in the box, ad client module 24 extracts the product identifier associated with the new element included in the box and sends the global unique identifier of the box and the new product identifier of the element to ad server module 20 to update integration data 36 to reflect the new association between the global unique identifier and the product identifier.

When user 18 creates a new box and populates the box with an ad element, ad client module 24 may send a command to ad server module 20 indicating that a new box was created and the product identifier associated with element used to populate the box. In this example, ad server module 20 creates a global unique identifier for the box and associates the global unique identifier with the product identifier received from ad client module 24 and the advertisement identifier for the advertisement being edited by user 18.

After making various changes to the advertisement, the advertisement may be reviewed and approved by another user (e.g., a supervisor). The advertisement may go through multiple iterations of editing and approval before the advertisement is ready for distribution. After the pages are finalized (e.g., after the pages move through an editing and approval process), DCP server 10 receives the finalized version of the pages for the advertisement (84). Data collection module 30 parses the final version of the pages into individual elements based on the boxes included on each page (86). Data collection module 30 extracts the global unique identifier from each box and retrieves the product identifier for the product associated with the box from integration data 36 based on the global unique identifier of the box and stores the graphical or textual element of the box in ad elements data store 16 (88). In some examples, data collection module 30 may also store information about the advertisement or the product as metadata associated with the graphical or textual element.

Techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

Techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media. In certain examples, a non-transitory media may store data that can, over time, change (e.g., in a RAM or cache).

Various examples have been described. These and other examples are within the scope of the following claims.

The invention claimed is:

1. A method for dynamically generating an advertisement with a computing device, the computing device including a programmable processor that executes software stored in a computer memory, the method comprising:
generating, with the computing device, a box configured to store information about each product to be included in the advertisement, the box being a software object that acts as a virtual container associated with advertising elements corresponding to the product, wherein each of the products is associated with a product identifier;
generating, with the computing device, a global unique identifier for the box;
storing in the computer memory a combination of the global unique identifier of the box with the product identifier of each of the products about which the box is configured to store information as integration data;
linking the advertising elements corresponding to each of the products by associating the global unique identifier with the product identifier of each of the products and maintaining an association between the global unique identifier of the box and identifiers associated with disparate data sources;
querying, with the computing device, an ad elements data store to retrieve a set of elements for the product based on the global unique identifier, the set of elements in the ad elements data store including textual ad elements and at least one of graphical ad elements and multimedia ad elements relating to the product that are selectively combined in the box to generate the advertisement, wherein each element in the set of elements was previously approved for use in connection with the product and was previously included in one or more different advertisements;

populating with the computing device, the box with an element of the set of elements for the product about which the box is configured to store information; and automatically generating the advertisement comprising the box with the computing device.

2. The method of claim 1, further comprising:

receiving, with the computing device, a finalized version of the advertisement comprising the box, wherein the box included in the finalized version of the advertisement stores an updated element;

collecting the updated element stored in the box;

retrieving, from the integration data, the product identifier for the product based on the global unique identifier associated with the box; and storing the updated element and the product identifier for the product in the ad elements data store.

3. The method of claim 2, wherein the finalized version of the advertisement includes textual information, wherein the textual information includes a text portion and a formatting portion, and wherein the formatting portion defines how the text portion is presented in the advertisement, the method further comprising:

when the updated information stored in the box comprises textual information,
generating graphical information based on the textual information;
maintaining the text portion as metadata associated with the textual information; and
storing the textual information, the graphical information, and the metadata in the ad elements data store.

4. The method of claim 1, wherein automatically generating the advertisement comprising the box comprises:

retrieving, with the computing device, a starting file for each page of a plurality of pages of the advertisement from a starting page data store, wherein the starting file for each page specifies layout information for the page, and wherein the starting file is configured differently based on a particular page type;

generating the plurality of boxes for each page based on the starting file for the page and the product information;

populating each of the plurality of boxes for each page with one or more ad elements; and placing each of the plurality of boxes in each page based on the starting file and the product information.

5. The method of claim 1, further comprising:

identifying one or more users responsible for reviewing the information about the product stored in the box using the global unique identifier of the box;

notifying the one or more users that the information about the product stored in the box is ready to review or approve.

6. The method of claim 1, wherein the box is configured to store graphical, textual, or multimedia information about the product.

7. The method of claim 1, further comprising:

receiving, with the computing device, the information about the product, wherein the product information is encoded in accordance with a first extensible markup language (XML) syntax; and transforming the product information from being encoded in accordance with the first XML syntax to being encoded in accordance with a second XML syntax.

8. The method of claim 1, wherein the product information for the product includes the product identifier that identifies the product, a promotion identifier that identifies the advertisement, a page identifier that identifies a page of the advertisement on which the product is to appear, and location information that indicates where the box is to appear on the page.

9. The method of claim 1, wherein the set of elements includes two or more elements for the product, the method further comprising:

selecting one element of the two or more elements for the product based on when each of the two or more elements were last included in a prior advertisement.

10. The method of claim 1, wherein the ad elements data store stores metadata associated with each element, and wherein the metadata includes at least one of temporal information, geographic information, demographic information, and keywords.

11. A system for dynamically generating an advertisement comprising:

one or more programmable processors;

an ad elements data store;

an advertisement server module executable by the one or more programmable processors to generate a box configured to store information about a product to be included in the advertisement, and generate a global unique identifier for the box, the box being a software object that acts as a virtual container associated with advertising elements corresponding to the product, wherein the product is associated with a product identifier;

a data integration module executable by the one or more programmable processors to store a combination of the global unique identifier of the box with the product identifier of the product about which the box is configured to store information as integration data, wherein the data integration module is programmed to link the advertising elements corresponding to the product by associating the global unique identifier with the product identifier, and wherein the data integration module is further programmed to identify related information from multiple data stores and to integrate the related information via the global unique identifier; and a data load module executable by the one or more programmable processors to query the ad elements data store to retrieve a set of elements for the product, the set of elements in the ad elements data store including textual ad elements and at least one of graphical ad elements and multimedia ad elements relating to the product that are selectively combined in the box to generate the advertisement, wherein each element in the set of elements was previously approved for use in connection with the product and was previously included in one or more different advertisements, wherein the advertisement server module populates the box with an element of the set of elements for the product about which the box is configured to store information and automatically generates the advertisement comprising the box.

12. The system of claim 11, further comprising:

a data collection module executable by the one or more programmable processors, wherein the ad server module receives a finalized version of the advertisement, wherein the box included in the finalized version of the advertisement stores an updated element, wherein the data collection module collects the updated element stored in the box, wherein the data integration module retrieves, from the integration data, the product identifier for the product based on the global unique identifier associated with the box, and wherein the data load module stores the updated element and the product identifier for the product in the ad elements data store.

13. The system of claim 12, wherein the finalized version of the advertisement includes textual information, wherein the textual information includes a text portion and a formatting portion, and wherein the formatting portion specifies how the text portion is presented in the advertisement, when the updated information stored in the box comprises textual information, wherein the collection module generates graphical information based on the textual information, and maintains the text portion as metadata associated with the textual information, and wherein the data load module stores the textual information, the graphical information, and the metadata in the ad elements data store.

14. The system of claim 11, further comprising:

a starting files data store configured to store advertisement starting files, wherein the data load module retrieves a starting file for each page of a plurality of pages of the advertisement from the starting files data store, wherein the starting file for each page specifies layout information for the page, wherein the advertisement server module automatically generates the advertisement at least by generating a plurality of boxes for each page based on the starting file for the page and the product information, populating each of the plurality of boxes for each page with one or more ad elements retrieved from the ad elements data store, and placing each of the plurality of boxes on each page of the plurality of pages based on the starting file and the product information.

15. The system of claim 11, wherein the advertisement server module identifies one or more users responsible for reviewing the information about the product stored in the box using the global unique identifier of the box, and notifies the one or more users that the information about the product stored in the box is ready to review or approve.

16. The system of claim 11, further comprising:

a data transform module executable by the one or more programmable processors, wherein the ad server module receives the information about the product, wherein the product information is encoded in accordance with a first extensible markup language (XML) syntax, and wherein the data transform module transforms the product information from being encoded in accordance with the first XML syntax to being encoded in accordance with a second XML syntax.

17. The system of claim 11, wherein the product information for the product includes the product identifier that identifies the product, a promotion identifier that identifies the advertisement, a page identifier that identifies a page of the advertisement on which the product is to appear, and location information that indicates where the box is to appear on the page.

18. The system of claim 11, wherein the set of elements includes two or more elements for the product, and wherein the ad server module selects one element of the two or more elements for the product based on when each of the two or more elements were last included in a prior advertisement.

19. The system of claim 11, wherein the ad elements data store stores metadata associated with each element, and wherein the metadata includes at least one of temporal information, geographic information, demographic information, and keywords.

20. A non-transitory computer-readable storage medium encoded with instructions for causing one or more programmable processors to:

generate a box configured to store information about a product to be included in an advertisement, the box being a software object that acts as a virtual container associated with advertising elements corresponding to the product, wherein the product is associated with a product identifier;

generate a global unique identifier for the box;

store a combination of the global unique identifier of the box with the product identifier of the product about which the box is configured to store information as integration data link the advertising elements corresponding to the product by associating the global unique identifier with the product identifier and by maintaining an association between the global unique identifier of the box and identifiers associated with disparate data sources;

query an ad elements data store to retrieve a set of elements for the product, the set of elements in the ad elements data store including textual ad elements and at least one of graphical ad elements and multimedia ad elements relating to the product that are selectively combined in the box to generate the advertisement, wherein each element in the set of elements was previously approved for use in connection with the product and was previously included in one or more different advertisements;

populate the box with an element of the set of elements for the product about which the box is configured to store information; and automatically generate the advertisement comprising the box.

21. A method for dynamically generating an advertisement with a computing device, the computing device including a programmable processor that executes software stored in a computer memory, the method comprising:

generating, with the computing device, a software object configured to store information about a product to be included in the advertisement, wherein the product is associated with a product identifier;

generating, with the computing device, a global unique identifier for the software object; associating, with the computing device, the global unique identifier of the software object with the product identifier of the product about which the software object is configured to store information;

linking the advertising elements corresponding to the product by the associating step, the associating further comprising identifying related information from multiple data stores and integrating the related information via the global unique identifier;

retrieving, with the computing device, a set of elements associated with the product using the product identifier, the set of elements including textual ad elements and at least one of graphical ad elements and multimedia ad elements relating to the product that are selectively combined in the software object to generate the advertisement, wherein each element in the set of elements was previously approved for use in connection with the product and was previously included in one or more different advertisements;

populating, with the computing device, the software object with an element of the set of elements for the product about which the software object is configured to store information;

associating, with the computing device, at least one of the global unique identifier of the software object or the product identifier of the product about which the software object is configured to store information with an element identifier of the element of the set of elements; and automatically generating the advertisement comprising the software object with the computing device.

\* \* \* \* \*